United States Patent [19]

Greenfield et al.

[11] 4,007,094
[45] * Feb. 8, 1977

[54] PROCESS AND APPARATUS FOR RECOVERING CLEAN WATER FROM AQUEOUS WASTES

[75] Inventors: Charles Greenfield, Murray Hill; Robert E. Casparian, Boonton; Anthony J. Bonanno, Parsippany, all of N.J.

[73] Assignee: Hanover Research Corporation, East Hanover, N.J.

[ * ] Notice: The portion of the term of this patent subsequent to Mar. 30, 1993, has been disclaimed.

[22] Filed: Dec. 15, 1975

[21] Appl. No.: 640,712

Related U.S. Application Data

[63] Continuation-in-part of Ser. No. 165,070, July 22, 1971, Pat. No. 3,947,327.

[52] U.S. Cl. .............................. 202/174; 159/1 RW; 159/13 A; 159/17 R; 159/DIG. 17; 159/DIG. 25; 203/7; 203/10; 208/187; 210/513
[51] Int. Cl.² ..................... B01D 1/26; B01D 3/34; B01D 3/02
[58] Field of Search .......... 159/1 RW, 20 R, 17 R, 159/13 A, DIG. 17, DIG. 25; 202/174; 203/7, 10; 208/187; 210/513

[56] References Cited

UNITED STATES PATENTS

| | | | |
|---|---|---|---|
| 1,997,980 | 4/1935 | Smith | 23/177 |
| 2,182,428 | 12/1939 | Fladmark | 159/48 L |
| 3,251,398 | 5/1966 | Greenfield | 159/47 R |
| 3,304,991 | 2/1967 | Greenfield | 159/13 A |
| 3,323,575 | 6/1967 | Greenfield | 159/13 A |
| 3,947,327 | 3/1976 | Greenfield et al. | 203/7 |
| 3,947,327 | 3/1976 | Greenfield et al. | 203/7 |
| R26,317 | 12/1967 | Greenfield | 159/17 R |
| R26,352 | 2/1968 | Greenfield | 159/13 A |

*Primary Examiner*—Jack Sofer
*Attorney, Agent, or Firm*—Richard L. Cannaday

[57] ABSTRACT

Process and apparatus for recovering clean water from aqueous wastes by evaporation while avoiding scaling and fouling as well as corrosion of the evaporator tubes. Addition of an oil, preferably a volatile oil, to the aqueous waste feed results in the formation of a coating of said oil on the surfaces of the tubes, thereby preventing corrosion and fouling and build-up of scale deposits. Volatile oil that distills over is separated from the aqueous distillate by conventional means and may be recirculated.

3 Claims, 1 Drawing Figure

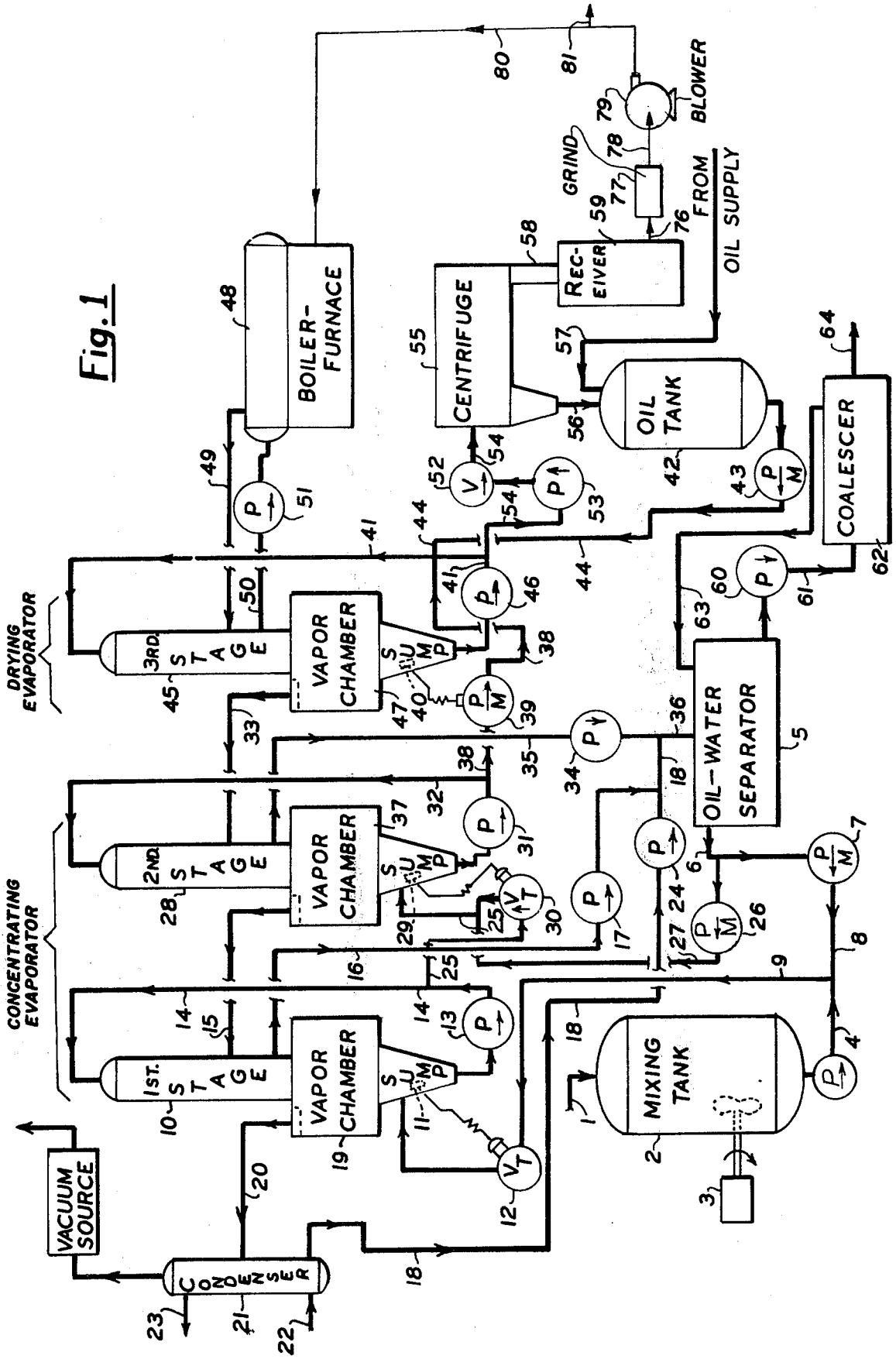

PROCESS AND APPARATUS FOR RECOVERING CLEAN WATER FROM AQUEOUS WASTES

CROSS-REFERENCE TO RELATED APPLICATION

This Application is a continuation-in-part of our co-pending Application Ser. No. 165,070, filed in the United States Patent and Trademark Office on July 22, 1971, and now U.S. Pat. No. 3,947,327, issued Mar. 30, 1976.

BACKGROUND OF THE INVENTION

The economic disposal of waste solids and the recovery of clean water from aqueous wastes is a recognized problem. Ideally, apparatuses and processes for the recovery of water from solutions of waste solids should provide ease of disposition, avoidance of pollution, economic operation, and hygienic handling and should, in addition, yield clean water. Furthermore, in the course or recovering clean water it is desirable to obtain other products or materials which are either valuable in themselves or may be utilized to further the economics of the process.

In one of the customary processes known to the prior art, water solutions of waste solids such as aqueous industrial wastes and brackish or salt waters are subjected to evaporation with subsequent condensation of the water vapor to thereby recover water free of the waste solids.

In many cases of direct evaporation, particularly direct multiple-effect evaporation, scaling or fouling of the evaporator tubes results. One of the measures taken to prevent evaporator scaling is the use of antiscaling compounds such as zeolites to remove dissolved minerals. However, industrial wastes, sewage and brackish and salt waters have such high levels of dissolved solids that the quantities of antiscaling compounds required make this procedure prohibitively expensive, and further result in disposal problems of the added chemicals.

As an alternative method to prevent evaporator scaling, evaporator manufacturers have resorted to separate tube nests which can be brought into operation as required so that the scaled or fouled evaporator units may be removed from the line and cleaned to remove the material that has caused the fouling or scaling. This changeover, which results in the loss of time and also results in disturbing the equilibrium of the evaporation system, requires operator attention and a considerable number of switching vales which may be operated either automatically or manually. Thus there is added capital cost due to the control system as well as the additional tube bundles required.

The materials which cause fouling and scaling of evaporator tubes are often corrosive in nature. Thus special alloys such as stainless steel and other high performance metals are often required for tube materials. This is yet another factor resulting in increased capital cost.

SUMMARY OF THE INVENTION

The apparatus and process of this invention comprise a systematic arrangement of equipment and a series of steps for recovering clean water from aqueous wastes by evaporation while avoiding fouling and scaling as well as corrosion of evaporator tubes. The apparatus and process of the present invention obviate antiscaling compounds and separate, switchable nests of evaporator tubes. In addition, the necessity for special alloys in the evaporation equipment is avoided.

It is therefore an object of this invention to provide a process and apparatus for recovering clean water economically from aqueous wastes by evaporation.

It is another object of this invention to provide a process and apparatus for recovering clean water from aqueous wastes by evaporation while avoiding scaling and fouling of the evaporator tubes.

It is still another object of this invention to provide a process and apparatus for recovering clean water from aqueous wastes by evaporation while avoiding corrosion of the evaporator tubes.

It is yet another object of this invention to provide a process and apparatus for recovering valuable by-products from aqueous wastes.

These and other objects of the present invention as well as its nature and substance will become apparent to those skilled in the art from the following description and claims considered in connection with the accompanying drawing.

Broadly, viewed in one of its principal aspects, this invention comprises a process for recovering clean water from aqueous wastes by evaporation while avoiding corrosion and scaling and fouling in the evaporator according to the following steps:

1. Adding an oil to said aqueous wastes and forming a mixture of said oil and wastes:
2. Concentrating said mixture of oil and aqueous wastes by heat evaporation in the course of which said mixture comes in contact with the evaporating surface of the evaporator to yield water vapor and concentrated aqueous wastes containing said oil, and
3. Condensing said water vapor.

The foregoing process is carried out in an apparatus for recovering clean water from aqueous wastes, said apparatus comprising a systematic arrangement of items of equipment as follows:

1. A tank adapted to receive a stream of said aqueous wastes,
2. An evaporator,
3. A conduit extending from said tank to said evaporator wherethrough may flow a stream of aqeuous wastes from said tank into the evaporating region of said evaporator,
4. A source of oil,
5. Means for transmitting oil from said source of oil to said conduit extending from said tank to said evaporator whereby a mixed stream of aqeuosu wastes and oil may be conducted into the evaporating region of said evaporator,
6. A combustion apparatus associated with said evaporator for supplying evaporative heat thereto,
7. A condenser,
8. A conduit extending from said evaporator to said condenser through which may flow water vapor formed as a result of evaporation of said mixture of aqeuous wastes and oil, and
9. A conduit extending from said condenser wherethrough may flow liquid water resulting from the condensation of water vapor.

By operating according to the present invention it is accordingly possible to recover clean water economically from aqueous wastes by evaporation while avoiding corrosion as well as scaling and fouling of evaporator tubes. In addition, valualbe by-products may be recovered from the aqueous wastes.

BRIEF DESCRIPTION OF THE DRAWING

FIG. 1 is a schematic diagram of the apparatus of the present invention in the nature of a flow sheet for the process thereof.

DESCRIPTION OF THE PREFERRED EMBODIMENT

The water recovery process of this invention as applied to aqueous wastes thus comprises adding an oil to an mixing it with such waste followed by evaporative concentration or dehydration wherein the oil and waste mixture comes into contact with the evaporating surface of the evaporator to yield evaporated water, i.e., water vapor, and a concentrated aqeuous waste containing at least a portion of the oil. The presence of the oil during evaporative concentration results in the formation of a coating of the oil on the surfaces of the evaporator, thereby preventing fouling and the build-up of scale deposits at the boiling surfaces of the evaporator such as the interior surfaces of the evaporator tubes. In addition, since the materials which cause fouling and scaling are often corrosive in nature, the presence of the protective oil film prevents corrosion of the evaporator heat transfer surfaces.

While either a non-volatile oil or a volative oil may be used in the evaporative concentration, use of a volatile oil is preferred. Evaporative concentration of mixtures of volatile oils and aqueous wastes yields water vapor containing at least a portion of the volatile oil and concentrated aqueous wastes containing substantially the remainder of that oil. Again, the volatile oil forms a protective film on the outside of rhe evaporator tubes or the condensing surface which prevents corrosion and fouling and the build-up of scale deposits in the evaporator. The volatile oil in the evaporated water or water vapor may be separated by conventional means.

In an embodiment of this invention the concentrated aqueous waste containing volatile oil is mixed with a heavy, non-volatile oil to obtain a mixture which will remain fluid and pumpable even after the removal of essentially its entire water content. The resulting mixture is subjected to a dehydration step by heat evaporation to yield evaporated water plus part of the volatile oil and a substantially anhydrous slurry of waste solids and oil. As before, the volatile oil is separated from the evaporated water by conventional means.

The essentially anhydrous slurry of waste solids and oil may, if desired, be separated to yield the oil and the waste solids in a largely dry and oil-free condition. This may be accomplished by mechanical pressure of either a static or a dynamic variety, or both, on the anhydrous slurry whereby the greater part of the oil is expressed from the solids. In some cases, as in the processing of sewage or slaughter house wastes, the waste itself contains a small amount of oil independently of oil which may be added to it. This oil will be carried thorugh the dehydration step along with the waste solids and the added oil, and be subjected to being pressed out of the dehydrated slurry along with the added oil. If the dry or essentially water-free slurry be pressed sufficiently vigorously it may thus be made to yield oil in a quantity or at a rate equal to or in excess of that in or at which oil was previously added to the aqueous waste. Generally it is desirable that the pressing step yield enough oil that the process will be self-sufficient with respect to oil requirements. Even more desirably, in some cases the pressing step will provide somewhat more oil than is needed so that the process will develop a net oil yield.

The dry waste solids left after the pressing operation may often be utilized for purposes outside the process itself and thus constitute a process product. The process and apparatus of this invention may be used to recover clean water from aqueous wastes derived from numerous sources. Thus, for example, this invention finds utility in the recovery of water in a variety of situations where materials are found in aqueous solution or water dispersion, e.g., inorganic and organic wastes including but not limited to brackish and saline waters, coal slimes and other inorganic slimes, cement in its manufacture, spent lime, sewage and sewage sludge, slaughter house effluents, rubbish and garbage, chemical wastes, pharmaceutical wastes, petrochemical and petroleum wastes, black liquor and other paper liquors, paper industry wastes, canning and packaging factory effluents, and food wastes such as those produced in the coffee, tea, starch, potato, sugar and dairy (whey) industries, and other industrial wastes. Accordingly, depending on the source, the dry waste solids recovered from the pressing operation may be used, for example, as fertilizer, animal feed, or even food products for human consumption. Further, since they are often burnable, they may be used as fuel for the generation of steam needed to run the evaporator components of the apparatus for the concentration step and the dehydration step and also the steam needed to run auxiliary equipment such as pumps, either directly if they be steam-driven pumps or indirectly if they be motor-driven pumps and the steam is used to run a turbogenerator directly. The process can thus be at least partly self-sufficient in respect of fuel requirements.

The process and apparatus of this invention thus provide means for the recovery of clean water from aqueous wastes and, in addition, allow for the recovery of valuable by-products therefrom. The material to be treated by the process of this invention should contain solids particles having a maximum size of about one-fourth inch. Larger particles can be ground to size or comminuted by existing techniques.

Any oil, volatile or non-volatile, may be utilized for admixture with the aqueous wastes prior to evaporative concentration, but oils which are low in viscosity and which contain appreciable levels of relatively volatile components are preferred. Typical examples of non-volatile oils are tallow, other animal fats and vegetable oils and their derivatives, petroleum oils and their fractions including edible mineral oils and derivatives including fuel oils, glycerides, glycols, and long chain fatty alcohols, non-volatile organic liquids and silicones. Typical of volatile oils are light lubricating oils, varsols, kerosene fractions of inedible and edible grades and feed grade derived from petroleum sources that have little or no water solubility, short chain fatty alcohols, and distillates from No. 2 up to No. 6 or higher viscosity heavy fuel oils, steam distillable organic liquids, and combinations or blends of light and heavy oils. In the evaporative concentration step, the mixture of oil and an aqueous waste is brought into contact with the evaporating surfaces of the evaporator where the oil forms a film. In the case where a volatile oil is used, the volatile components are codistilled with the water and are thus available to wash down and form a film on the outside of the evaporator tubes. The tube surfaces are therefore kept clean and fouling and scaling, as well as corrosion, are prevented.

The quantity of oil which is to be added to the aqueous waste feed is empiric since in cases where severe corrosion or scaling is to be avoided, e.g., in the case of concentrating or drying sulfuric acid wastes, the waste feed material itself may be just a small fraction by weight of the oil which is added to it. In general, however, the oil represents from ½% to 50% by weight of the aqueous waste feed, and preferably it represents from about 3% to about 15% by weight of the waste feed material with which it is mixed. In the utilization and embodiment of this invention where complete drying is carried out involving the addition of a heavy, non-volatile oil to the concentrated aqueous wastes, any residual oil present in the concentrated aqueous wastes will blend with the heavy oil added to the system prior to evaporative dehydration.

When complete drying is carried out the oils which are utilized for admixture with the concentrated aqueous wastes are inert, relatively non-volatile oils or fats, or other oil-like materials, However, any volatile components my be recovered for use in the concentration step. Examples of these heavy oils are tallow, other animal fats and vegetable oils, petroleum oils and their fractions, glycerides, glycols, and miscellaneous liquid wastes from industrial plants, being generally organic in nature. The quantity of heavy oil that is used is such that its ration in the system is in the range of about two to about twenty parts by weight based on each part of non-fat solids in the aqueous wastes. This refers to total oil, i.e., added non-volatile oil, residual oil present in the concentrated wastes, and oil derived from the process itself, i.e., present in the aqueous wastes. This amount of oil gives a fluid, pumpable mixture even in the absence of water. The term "fluid" as used here is intended to be synonymous with "liquids", i.e., taking the shape of the container to the extent that the mixture fills the container. This includes heavy, viscous fluids which are pumpable but still suitable for heat transfer purposes.

While the concentration step and the dehydration step of this invention may each be carried out in the single-stage or single-effect evaporators known in the art, it is usually preferred that each of these steps be accomplished in a plurality of sequential heat evaporation steps wherein each of the successive evaporation steps is at a successively higher temperature and the resulting aqueous waste streams are of successively higher concentrations because of increasing dehydration, the evolved vapors of each succeeding evaporation step supplying a substantial portion of the heat requirements of the preceding heat evaporation step. Thus the plurality of sequential heat evaporation steps connotes at least two. The equipments that can be employed are multiple effect evaporators known in the art, e.g., Mojonnier, Bufflovak, Rodney-Hunt, etc. Functionally, the evaporator equipment may be of the forced circulation, flash, falling film recirculation, single pass, rotary wiped film, or indeed any suitable type. The evaporator system overall may be single-stage or multi-stage, single effect or multi-effect, forward flow or backward or reverse flow, thermal and mechanical recompression, or indeed any suitable system.

The temperatures, pressures and concentrations in each of the successive series of evaporation steps are largely empiric in nature, depending upon the systems and oils being employed. Typical processing temperatures for the initial concentration of mixtures of oils and aqueous wastes may be in the range of about 80° F to about 130° F in the first stage, about 130° F to about 170° F in the second stage, about 150° F to about 200° F in the third stage, and about 190° F to about 230° F in the final stage of a quadruple-effect evaporating system. The preferred processing temperatures are in the range of from about 90° F to about 125° F in the first stage, from about 135° F to about 145° F in the second stage, from about 155° F to about 170° F in the third stage, and about 200° F in the fourth or final stage.

The normal processing temperatures for the dehydration of mixtures of oil and concentrated aqueous wastes may be in the range of about 130° F to about 300° F in the first stage and about 150° F to about 400° F in the second, third or final stages of a multi-effect drying system. The preferred processing temperatures are in the range of from about 180° F to about 250° F in the first stage and from about 200° F to about 350° F in the second, third or last stages. The foregoing ranges and progressions of temperatures are reasonable in the case where the flows through the evaporator of the mixture being concentrated or dehydrated and the heating or drying steam are substantially countercurrent, the evaporator in this mode of operation being called a backward flow evaporator. The temperatures also depend on the desired quality of the end product as well as economics of fuel utilization, cooling water availability, capital investment, etc.

In the foregoing paragraph the expression "first stage" refers to that part of the evaporator equipment in which mixtures of oil and aqueous wastes or mixtures of oil and concentrated aqueous wastes are subjected to the first step of a sequential plurality of evaporation steps, two or three or more corresponding to "second stage", "third stage", etc. The expression "effect" on the other hand, as in "multiple-effect" or "multi-effect", is related to the flow and action of the heating medium, customarily steam, in the evaporator equipment. Where the flow of a mixture of an aqueous waste and oil or a mixture of a concentrated aqueous waste and oil being heated and evaporated is countercurrent to that of the heating steam (backward flow), the first stage of the evaporator is the same as its last effect.

The pressures are not critical and are controlled with temperatures to achieve desired evaporation rates in a given design. Thus the first stage pressure will conveniently be from about ½ in. Hg absolute to atmospheric or higher pressure depending upon the number of stages and the temperatures spread and pressure requirements resulting from the temperature spread. The pressures then increase in successive stages responsive to the temperatures in the aforedescribed countercurrent or backward flow case. It is advantageous to operate the first stage at subatmospheric pressures, and the final stages at pressures close to atmospheric or higher.

The advantage of employing sequential evaporation steps may be seen from the following. For example, in a double-effect evaporator with feed entering at 80° F the material can leave the evaporator at 225°–250° F with ratios of approximately one pound of steam utilized for approximately 1 ½ to 1 ¾ pounds of water evaporated; whereas in a simple single-effect operation about 1 ½ pounds of steam would be required to achieve the same result so far as temperatures are concerned with only one pound of water evaporated. If triple or more effect evaporation be utilized even further economies in fuel consumption are made possible. It should be noted that the evolved vapors from each succeeding one of the heat evaporation steps supply a substantial portion of the heat requirement of the preceding heat evaporation step in the case of a backward flow evaporator. The only net heat input is that required to raise the temperature of the components to evaporation temperatures and make up for heat losses.

Thus by adding an oil to aqueous wastes, clean water may be recovered by evaporation while corrosion as well as scaling and fouling of the evaporator tubes is prevented or avoided. If desired, dissolved solids may be recovered by crystallization from the thus concentrated mixtures of oil and aqueous wastes. Alternatively, if a non-volatile oil be used in the concentration step or if a non-volatile oil be added to a mixture of a concentrated aqueous waste and a volatile oil essentially all the remaining water may be removed by evaporation. The final product from the dehydration step is generally a substantially anhydrous oil-waste solids slurry containing no more than about 1–10 weight percent water on a non-fat basis. The water content is such as to permit fuel efficiency when the waste solids which have been separated from the oil are burned or representation of those solids as being in an essentially dry state when they are disposed of as a marketable product. Thus, by operating according to this invention, essentially all the water is efficiently recovered from aqeuous wastes in a clean state by evaporative techniques with avoidance of corrosion as well as scaling and fouling of evaporator tubes. In addition, valuable solids may be recovered.

The present invention and its advantages will be better understood by referring to certain particular embodiments discussed in detail in connection with the flow diagram shown in the drawing. Referring now to the flow diagram of FIG. 1, a stream of aqueous waste material flows into mixing or homogenizing tank 2 through line 1. The system is stirred or churned in tank 2 by means of an agitating device 3 and steadily withdrawn from the tank by a bottom pump and discharged through line 4. Oil, assumed to be volatile oil, from oil-water separator 5 passes through line 6 to metering pump 7 which delivers the oil through line 8 which meets line 4 at a "T". There the volatile oil becomes mixed with the homogenized aqueous waste material flowing from tank 2 and the resulting combined stream of aqueous wastes and volatile oil flows through leg 9 of the "T" to the sump of first stage or third effect recycle evaporator 10. Level sensing element 11 in that sump controls the opening or adjustment of throttle valve 12 in feed line 9 to maintain a desired liquid level in the sump.

Pump 13 withdraws the mixture of aqueous wastes and volatile oil from the first stage sump and discharges it through line 14 to the evaporating region of first stage or third effect recycle evaporator 10. In that region water and part of the volatile oil are boiled off at a subatmospheric pressure which may typically be about 2 in. Hg absolute. First stage evaporator 10 is operated at a temperature in the range of about 80°–130° F and preferably about 90°–125° F, depending upon the pressure in the evaporator. The system is heated by vapors of water and volatile oil from line 15 which are at a temperature about 20° F higher than the temperature maintained within evaporator 10. Condensates of the heating vapors are withdrawn through line 16 and delivered by pump 17 to product water/-volatile oil outlet line 18. Water vapor and volatile oil vapor formed as a result of the concentration of the mixture of aqueous wastes and oil in the first stage evaporator are removed from vapor chamber 19 through line 20 to surface condenser 21. Cooling water from a suitable source enters that condesner through line 22 and leaves through 23. The condensate of water and volatile oil is withdrawn from condenser 21 by pump 24 and discharged by that pump through product water and volatile oil outlet line 18. Non-condensables are withdrawn and a reduced pressure maintained in the condenser by a vacuum source as shown.

A portion of the recirculating, partially concentrated mixture of oil and aqueous waste material is taken off from line 14 through line 25. Additional volatile oil from oil-water separator 5 passes through line 6 to metering pump 26 which delivers that oil through line 27 connecting with line 25 at a "T". There the additional volatile oil blends with the mixture of partially concentrated aqueous wastes and oil from recycle evaporator 10 and the resulting mixture is conducted through line 25 to the sump of second stage recycle evaporator 28. Level sensing element 29 in that sump controls the opening or adjustment of throttle valve 30 in feed line 25 ahead of the junction with line 27 to maintain a desired liquid level in the sump.

Pump 31 withdraws the mixture of partially concentrated aqueous wastes and volatile oil from the second stage sump and discharges it through line 32 to the evaporating region of second stage recycle evaporator 28. In the second stage evaporator a procedure is followed similar to that in the first stage except that the pressure is generally higher. Second stage evaporator 28 is operated at a temperature in the range of about 130°–170° F and preferably about 135°–145° F, depending upon the pressure in the evaporator. The system is heated by vapors of water and volatile oil from line 33 which are at a temperature about 20° F higher than the temperature maintained within evaporator 28. Condensates of the heating vapors are withdrawn by pump 34 and delivered through line 35 to a "T" connection with product water-volatile oil outlet line 18. Leg 36 of the "T" conducts all heretofore mentioned streams or accumulations of condensed product water and volatile oil to oil-water separator 5. Mixed water vapor and volatile oil vapor formed as a result of the further concentration of the mixture of partially concentrated aqueous wastes and volatile oil are removed from second stage vapor chamber 37 through line 15 and go on to serve to heat the evaporating region of first stage evaporator 10. First stage evaporator 10 and second stage evaporator 28 are therefore concentrating evaporators and together are a multiple effect concentrating evaporator.

A portion of the recirculating concentrated mixture of oil and aqueous waste material is taken off from line 32 through line 38. Metering pump 39 in line 38, controlled by level sensing device 40 in the sump of the third stage evaporator, discharges the concentrated withdrawn mixture portion through line 38 which connects with line 41 from the third stage sump at a cross. Heavy, nonvolatile oil from tank 42 is delivered by metering pump 43 through line 44 which also connects with line 41 at the aforementioned cross. There the heavy oil becomes mixed with the mixture of concentrated aqueous wastes and volatile oil, and the resulting or combined mixture is conducted through line 41 to the evaporating region of third stage recycle evaporator 45. In the third stage evaporator, which is the drying stage or drying evaporator, a procedure is followed similar to that in the second stage except that the pressure is generally higher.

Third stage evaporator 45 is operated at a temperature in the range of about 130°–300° F and preferably about 180°–250° F, depending upon the pressure in the evaporator. The mixture of heavy oil, volatile oil, and concentrated aqueous wastes withdrawn of flowing from the sump of evaporator 45 is delivered by pump 46 through line 41 and recycled to the evaporating region of that evaporator until essentially all the water vapor and volatile oil vapor formed as a result of the dehydration step are removed from third stage vapor chamber 47 through line 33 and go on to serve to heat the evaporating region of second stage evaporator 28. Third stage evaporator 45 is heated by steam generated in boiler-furnace 48 and conducted to that evaporator stage through line 49. Condensate of the heating steam is withdrawn through line 50 and delivered by feed pump 51 back to the boiler furnace.

Valve 52, a manually adjusted valve opened to a predetermined setting, is disposed as a discharge control valve on the outlet side of pump 53 located in line 54, one end of which is connected into line 41 just beyond the discharge side of pump 46. At its other and outlet end line 54 is connected to centrifuge 55, and a regulated flow of an essentially anhydrous slurry of waste solids in heavy oil is delivered through line 54 to the centrifuge. Centrifuge 55 separates the dehydrayted waste solids in heavy oil slurry, a fraction of the material flowing in line 41, into two streams. One of those streams, a stream of relatively clear heavy oil, is discharged and delivered through ine 56 to oil tank 42. Should the system generate heavy oil in excess of that needed for fluidizing purposes, that excess or net product oil may be withdrawn from tank 42. If there be a net loss of heavy oil in the process through more oil remaining with the dry waste solids than is brought in as part of the aqueous waste feed stream, make-up heavy oil may be added to the system at tank 42 through line 57. The other stream from centrifuge 55, a stream containing substantially all of the waste solids, is discharged and delivered through line 58 into receiver 59.

The waste solids flowing from the centrifuge into the receiver may contain from about 3% to about 50% by weight of oil. If desired, those solids may be subjected to further removal of oil for return to circulation by means of a pressing apparatus in the nature of a reciprocating press or liquid-solid separator, for example, a piston-type, perforated barrel or curb or cage press such as that disclosed in U.S. Pat. No. 1,135,309 issued to E. T. Meakin on Apr. 13, 1915. It may be a press of that nature, but it may also be a press of any other suitable kind. In the general sense, of course, centrifuge 55 itself may be regarded as a liquid-solid separating press, one in which pressures or separating forces are generated dynamically rather than statically. It is within the contemplation of the present invention that certain aqueous wastes amenable to processing in accordance with it will yeild dry slurries at the sump discharge of third of final stage evaporator 45 which can be separated economically and adequately into their non-fat solids and heavy oil components by means of a single piece of mechanical equipment only, that is, for example, by either a centrifuge alone or a perforated barrel press alone.

Assuming that the aqueous waste feed material is originally oil-containing, the vigor of the operation performed in and by centrifuge 55 and any other pressing equipment present will determine whether or not te system generates a net oil product which can be withdrawn. Centrifuging or pressing down to just a "break even" level of residual heavy oil in the waste solids will allow the system to function without the addition of any heavy oil except the quantity needed for start-up purposes, but also without the possibility of generating any net oil product. Centrifuging to a higher level than the "break even" level, that is a level at which there is more residual heavy oil in the centrifuged or further pressed waste solids than there was oil originally associated with those solids in the aqueous wastes flowng into the system through line 1, will not only eliminate the possibility of a net oil product but also require that the system be supplied continuously with heavy oil for make-up purposes.

The dry waste solids discharged from centrifuge 55 into receiver 59 contain some residual heavy oil in all practical cases, but desirably no more than about 20–40% by weight. If the waste solids be organic they may be comminuted and used as fuel in boiler-furnace 48. The solids, in cake or chunk form, are delivered from receiver 59 via conduit 76 to grinder 77 where they are reduced to granular if not powder form, and from the grinder they flow through line 78 to the suction side of blower 79. The blower discharges the comminuted waste solids as fuel through line 80 to boiler-furnace 48. Alternatively, waste solids that are either organic or inorganic may be withdrawn from receiver 59 to via conduit 76 and, after being discharged by blower 79, discharged through line 81 for employment outside the illustrated system if such employment, for example employment as fertilizer, represent a use that is higher or more valuable than use as fuel.

As pointed out hereinbefore, the mixture of product water and volatile oil from the concentration and dehydration steps is conducted through line 36 to oil-water separator 5. The water phase, containing some volatile oil, is delivered by pump 60 through line 61 to coalescer 62. In that coalescer essentially complete separation of the remainder of the volatile oil from the product water occurs. Volatile oil from coalescer 62 is returned through line 63 to oil-water separator 5 from which it may be withdrawn through line 6 and added to the aqueous wastes prior to the concentration steps. Clean water, essentially completely free from volatile oil, is withdrawn from coalescer 62 through line 64. While in the given description of the employment of the apparatus embodiment of the present invention shown in FIG. 1 utilization of a volatile oil has been included, especially for the first and second or concentrating evaporator stage, it will be understood that a heavy oil with little if any volatile material could be used in its stead, although that would not be a preferred use.

It has been found surprisingly that a volatile oil of low viscosity such as a kerosene fraction derived from pertroleum sources, or an oil derived from the distillation of heavy fuel oils such as may be employed in the dehydration system, does not apparently affect to any degree the evaporation rate of the materials being concentrated. In fact, heat exchange is so good that "U" values (BTU/hr./ft.$^2$/°F) of 300 to 400 are obtained readily in a falling film evaporator operating in a thermal range where product temperatures are from about 120° to about 170° F. These "U" or heat transfer coefficient values are indeed high when one compares them with the values obtained for materials which tend to scale, where they rapidly drop to about 150 or less. Thus it appears that the volatile oil washing down the evaporator tubes prevents build-up of scale and fouling, thereby ensuring good heat transfer. In addition, the volatile oil washing down and wetting the evaporator tubes provides an oil film on the surface which prevents corrosion.

While a specific apparatus embodiment of the present invention has been shown and itself and its process operations described in detail to illustrate the employment of the inventive principles, it will be understood that the invention may be embodied otherwise in particulars without departing from such principles. Protection by Letters Patent of this invention in all its aspects as the same are set forth in the appended claims is sought to the broadest extent that the prior art allows.

We claim as our invention:

1. An apparatus for recovering clean water from aqueous wastes, said apparatus comprising (1) a tank adapted to receive a stream of said aqueous wastes, (2) an evaporator, (3) a conduit extending from said tank to the evaporating region of said evaporator wherethrough may flow a stream of aqueous wastes from said tank, (4) an oil-water separator, (5) means for transmitting volatile oil from said oil-water separator to said conduit extending from said tank to said evaporator whereby a mixed stream of aqueous wastes and volatile oil may be conducted into the evaporating region of said evaporator, (6) a condenser, (7) a conduit extending from said evaporator to the condensing region of said condenser through which may flow a vapor of water and volatile oil formed as a result of evaporation of said mixture of aqueous wastes and volatile oil, (8) a conduit extending from said condenser to said oil-water separator wherethrough may flow a liquid mixture of water and volatile oil formed as a result of condensation of said vapor of water and volatile oil, (9) evaporative means for dehydrating mixtures of concentrated aqueous wastes and volatile oil, (10) a conduit extending from said evaporator to said evaporative means wherethrough may flow a mixed stream of concentrated aqueous wastes and volatile oil from said evaporator, and (11) a conduit extending from said evaporative means to the heating region of said evaporator through which may flow a vapor of water and volatile oil formed as a result of dehydration of said concentrated aqueous wastes and volatile oil mixture, said vapor of water and volatile oil supplying evaporative heat to said evaporator.

2. The apparatus of claim 1 wherein said evaporative means is an evporator having a combustion apparatus associated therewith for supplying evaporative heat thereto.

3. The apparatus of claim 1 further comprising (12) a reservoir adapted to contain non-volatile oil and (13) means for transmitting non-volatile oil from said reservoir to said conduit extending from said evaporator (2) to said evaporative means (9) whereby a mixed stream of concentrated aqueous wastes, volatile oil and non-volatile oil may be conducted to said evaporative means (9).

* * * * *

UNITED STATES PATENT AND TRADEMARK OFFICE
CERTIFICATE OF CORRECTION

PATENT NO. : 4,007,094

DATED : February 8, 1977

INVENTOR(S) : Charles Greenfield, et al.

It is certified that error appears in the above—identified patent and that said Letters Patent is hereby corrected as shown below:

Column 1, line 20, "or" should read --of--;

line 49, "vales" should read --valves--.

Column 2, line 50, "aqeuosu" should read --aqueous--;

line 67, "valualbe" should read --valuable--.

Column 3, line 11, "an" should read --and--;

line 15, "aqeuous" should read --aqueous--;

line 33, "rhe" should read --the--;

line 57, "thorugh" should read --through--.

Column 5, line 29, "ration" should read --ratio--.

Column 6, line 51, "temperatures" should read --temperature--.

Column 7, lines 6-7, "rerequired" should read --required--;

line 29, "aqeuous" should read --aqueous--.

Column 8, line 6, "condesner" should read --condenser--.

UNITED STATES PATENT AND TRADEMARK OFFICE
CERTIFICATE OF CORRECTION

PATENT NO. : 4,007,094
DATED : February 8, 1977
INVENTOR(S) : Charles Greenfield, et al.

It is certified that error appears in the above—identified patent and that said Letters Patent is hereby corrected as shown below:

Column 9, line 9, "of" should read --or--;

lines 30-31, "dehydrayted" should read --dehydrated--;

line 34, "ine" should read --line--;

line 61, "yeild" should read --yield--.

Column 10, line 4, "te" should read --the--;

line 15, "flowng" should read --flowing--;

line 33, "to" should be omitted.

Column 12, line 22 (claim 2, line 2), "evporator" should read --evaporator--.

Signed and Sealed this

Twenty-third Day of November 1982

[SEAL]

Attest:

GERALD J. MOSSINGHOFF

Attesting Officer   Commissioner of Patents and Trademarks